US008012028B1

(12) United States Patent  (10) Patent No.: US 8,012,028 B1
McNamara  (45) Date of Patent: Sep. 6, 2011

(54) MODULAR TABLE SUPPORT SYSTEM FOR GAMING MACHINES

(76) Inventor: Jack McNamara, Philadelphia, PA (US)

( * ) Notice: Subject to any disclaimer, the term of this patent is extended or adjusted under 35 U.S.C. 154(b) by 489 days.

(21) Appl. No.: 12/273,750

(22) Filed: Nov. 19, 2008

Related U.S. Application Data

(60) Provisional application No. 61/003,451, filed on Nov. 19, 2007.

(51) Int. Cl.
- A63F 9/24 (2006.01)
- A63F 13/00 (2006.01)
- G06F 17/00 (2006.01)
- G06F 19/00 (2011.01)

(52) U.S. Cl. .......................................... 463/46; 248/676
(58) Field of Classification Search ............... 463/46; 361/679.02; 248/146, 158, 346.01, 676, 248/678; D21/397, 334, 522; D06/329, D06/396, 451, 480
See application file for complete search history.

(56) References Cited

U.S. PATENT DOCUMENTS

| | | | | |
|---|---|---|---|---|
| D114,650 S | * | 5/1939 | Valenzuela et al. | D21/397 |
| D298,557 S | * | 11/1988 | McNally | D21/375 |
| 5,324,036 A | * | 6/1994 | Morrow | 463/47 |
| 5,558,418 A | * | 9/1996 | Lambright et al. | 312/321.5 |
| 5,630,303 A | * | 5/1997 | Devenish, III | 52/295 |
| 5,636,822 A | * | 6/1997 | Hendershot et al. | 248/346.01 |
| 5,655,966 A | * | 8/1997 | Werdin et al. | 463/25 |
| 5,785,293 A | * | 7/1998 | Ford et al. | 248/649 |
| 5,791,092 A | * | 8/1998 | Strieter | 52/27 |
| D399,680 S | * | 10/1998 | Mak | D6/480 |
| 6,019,325 A | * | 2/2000 | Dotson et al. | 248/121 |
| D427,649 S | * | 7/2000 | Mak | D21/522 |
| 6,113,050 A | * | 9/2000 | Rush | 248/346.01 |
| 6,282,084 B1 | * | 8/2001 | Goerdt et al. | 361/679.55 |
| 6,361,133 B1 | * | 3/2002 | Carr | 312/351.2 |
| 6,427,966 B1 | * | 8/2002 | Blumenschein | 248/678 |
| 6,435,970 B1 | * | 8/2002 | Baerlocher et al. | 463/46 |
| 6,604,720 B1 | * | 8/2003 | Wilson | 248/177.1 |
| 6,651,985 B2 | * | 11/2003 | Sines et al. | 273/309 |
| 6,707,668 B2 | * | 3/2004 | Huang | 361/679.48 |
| 6,825,415 B1 | * | 11/2004 | Chen et al. | 174/63 |
| 7,163,141 B1 | * | 1/2007 | Parker | 232/39 |
| 7,364,160 B2 | * | 4/2008 | Seelig et al. | 273/143 R |
| 7,472,909 B1 | * | 1/2009 | Gordon | 273/309 |
| D588,832 S | * | 3/2009 | Mohundro | D6/430 |
| 7,542,296 B1 | * | 6/2009 | Baik et al. | 361/730 |
| 7,600,736 B2 | * | 10/2009 | Lee | 248/551 |
| 7,857,276 B2 | * | 12/2010 | Chen | 248/346.01 |
| 7,938,728 B2 | * | 5/2011 | Vetter et al. | 463/46 |
| 2001/0000118 A1 | * | 4/2001 | Sines et al. | 273/274 |
| 2001/0000778 A1 | * | 5/2001 | Sines et al. | 463/11 |
| 2002/0002072 A1 | * | 1/2002 | Sines et al. | 463/12 |
| 2002/0016193 A1 | * | 2/2002 | Morris et al. | 463/1 |
| 2004/0002389 A1 | * | 1/2004 | Sartini | 463/46 |
| 2004/0038728 A1 | * | 2/2004 | Adams | 463/20 |

(Continued)

*Primary Examiner* — N Drew Richards
*Assistant Examiner* — Grant Withers
(74) *Attorney, Agent, or Firm* — LaMorte & Associates, P.C.

(57) ABSTRACT

A system and method for mounting gaming machines to a support, in a manner that enables gaming machines to be quickly and easily installed and removed. A mounting base is provided for each gaming machine. Ports are formed in the support that are shaped to receive the mounting bases. Once a gaming machine is placed on the support, the mounting base passes into a port and the gaming machine sits flush on the support. Mechanical fasteners are then used to lock the mounting bases into the ports so that the gaming machines cannot be removed from the support. The gaming machines are also connected to power cables and signal cables under the top surface of the support.

20 Claims, 3 Drawing Sheets

U.S. PATENT DOCUMENTS

| | | | |
|---|---|---|---|
| 2004/0079855 A1* | 4/2004 | Strabel, III | 248/650 |
| 2004/0251630 A1* | 12/2004 | Sines et al. | 273/274 |
| 2004/0262485 A1* | 12/2004 | Marceau et al. | 248/346.01 |
| 2005/0103964 A1* | 5/2005 | Baechle | 248/346.01 |
| 2005/0215326 A1* | 9/2005 | Iosilevsky | 463/46 |
| 2006/0178182 A1* | 8/2006 | Sines et al. | 463/12 |
| 2006/0205472 A1* | 9/2006 | Sines et al. | 463/16 |
| 2007/0049368 A1* | 3/2007 | Kuhn et al. | 463/12 |
| 2007/0049369 A1* | 3/2007 | Kuhn et al. | 463/12 |
| 2007/0060391 A1* | 3/2007 | Ikeda et al. | 463/46 |
| 2007/0072663 A1* | 3/2007 | Kuhn et al. | 463/11 |
| 2007/0072664 A1* | 3/2007 | Kuhn et al. | 463/11 |
| 2007/0072682 A1* | 3/2007 | Crawford et al. | 463/46 |
| 2007/0114353 A1* | 5/2007 | Shen et al. | 248/346.01 |
| 2007/0142107 A1* | 6/2007 | Kuhn et al. | 463/16 |
| 2009/0011839 A1* | 1/2009 | Cole | 463/46 |
| 2009/0124396 A1* | 5/2009 | Vetter et al. | 463/46 |
| 2009/0166151 A1* | 7/2009 | Martin et al. | 194/317 |
| 2009/0221375 A1* | 9/2009 | Luciano et al. | 463/46 |
| 2010/0002366 A1* | 1/2010 | Pav | 361/679.02 |
| 2010/0222148 A1* | 9/2010 | Kuhn et al. | 463/46 |
| 2010/0227694 A1* | 9/2010 | Cole et al. | 463/46 |
| 2010/0298056 A1* | 11/2010 | Gawel | 463/46 |

* cited by examiner

MODULAR TABLE SUPPORT SYSTEM FOR GAMING MACHINES

RELATED APPLICATIONS

This application is a continuation-in-part of U.S. Provisional Patent Application No. 61/003,451, entitled Modular Table Support System For Gaming Machines, filed Nov. 19, 2007.

BACKGROUND OF THE INVENTION

1. Field of the Invention

In general, the present invention relates to support structures that are used in casinos to support gaming machines, such as slot machines. More particularly, the present invention relates to support structures that carry the wire cables used to power and monitor the operation of gaming machines.

2. Prior Art Statement

Most all modern casino gaming machines are electrically powered. Furthermore, the gaming machines contain computerized processing units that are networked. This enables gaming machines to both communicate with one another and communicate with remote monitoring stations. Accordingly, both power cables and signal cables must extend into each gaming machine in the casino. Furthermore, the various cables must be hidden from view and protected so that patrons in the casino do not accidentally or intentionally disrupt a power line or signal cable.

In order to protect the wires and cables that lead into gaming machines, gaming machines are most often mounted on support bases. The support bases elevate the gaming machines to an ergonomically proper height for patrons. The various wires and cables are routed through the support bases to the gaming machines, where they are protected and shielded from view.

A problem with most gaming machine support bases is that the base is solid. That is, it extends continuously from the bottom of the gaming machine to the casino floor. This prevents a casino patron from placing their legs under the gaming machine. As a result, chairs are mounted or placed a few feet in front of gaming machines in casinos. Casino patrons must, therefore, lean forward to play the casino game when they are sitting.

It has long been understood by casino owners that comfortable patrons play longer and spend more money at gaming machines than do uncomfortable ones. For many patrons, the task of leaning forward to play a casino game is uncomfortable. This is especially true for older patrons. It has therefore been a goal of casinos to obtain support platforms for gaming machines that not only protect the various cables and wires, but have open bottoms. In this manner, a casino patron can pull a chair up close to the gaming machine and extend his/her legs under the gaming machine.

Another problem associated with prior art gaming machine supports is that the support is often customized to the needs of the gaming machine. That is different gaming machines have electrical cables and signal cables that extends from the gaming machine at different places. Furthermore, each type of gaming machine has different areas designed to receive mounting bolts. As such, a unique pattern of holes must be drilled into the support for a specific gaming machine. If a particular gaming machine is removed for repair or refurbishment, another gaming machine cannot be placed upon its support. Rather, the support must be drilled with a new hole pattern that is proper for the new gaming machine. This is a time consuming and labor intensive process. It will also be understood that only a limited number of holes can be drilled into a support before the structural integrity of the support is compromised and the support must be replaced.

A need therefore exists for an improved gaming machine support structure that provides legroom while still protecting all electrical cables. A need also exists for a support structure for a gaming machine that can receive any type of gaming machine without modifications or alterations.

These needs are met by the present invention as described and claimed below.

SUMMARY OF THE INVENTION

The present invention is a system and method for mounting a gaming machine to a support, in a manner that enables gaming machines to be quickly and easily installed and removed without tools.

A mounting base is provided for each gaming machine that is to be mounted on the support. The support holds the gaming machines at an ergonomically proper height. Ports are formed in the support that are shaped and sized to receive the mounting bases. Once a gaming machine is placed on the support, the mounting base passes into a port and the gaming machine sits flush on the support. Mechanical fasteners are then used to lock the mounting bases into the ports so that the gaming machines cannot be removed from the support.

In addition to being mechanically locked to the underlying support, the gaming machine is also connected to a power cable and signal cable under the top surface of the support. The gaming machine is therefore readied for use without any cables being visible. The various cables run through the structure of the support. This enables the support to be configured as a table with open legroom space under the gaming machines.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system can be used to support many types of games, such as video poker games, the present invention system is shown in conjunction with slot machines in the illustrated example. The use of slot machines should be considered a mere example of an existing casino gaming machine and should not be considered a limitation when interpreting the scope of the claims.

Figure 1:
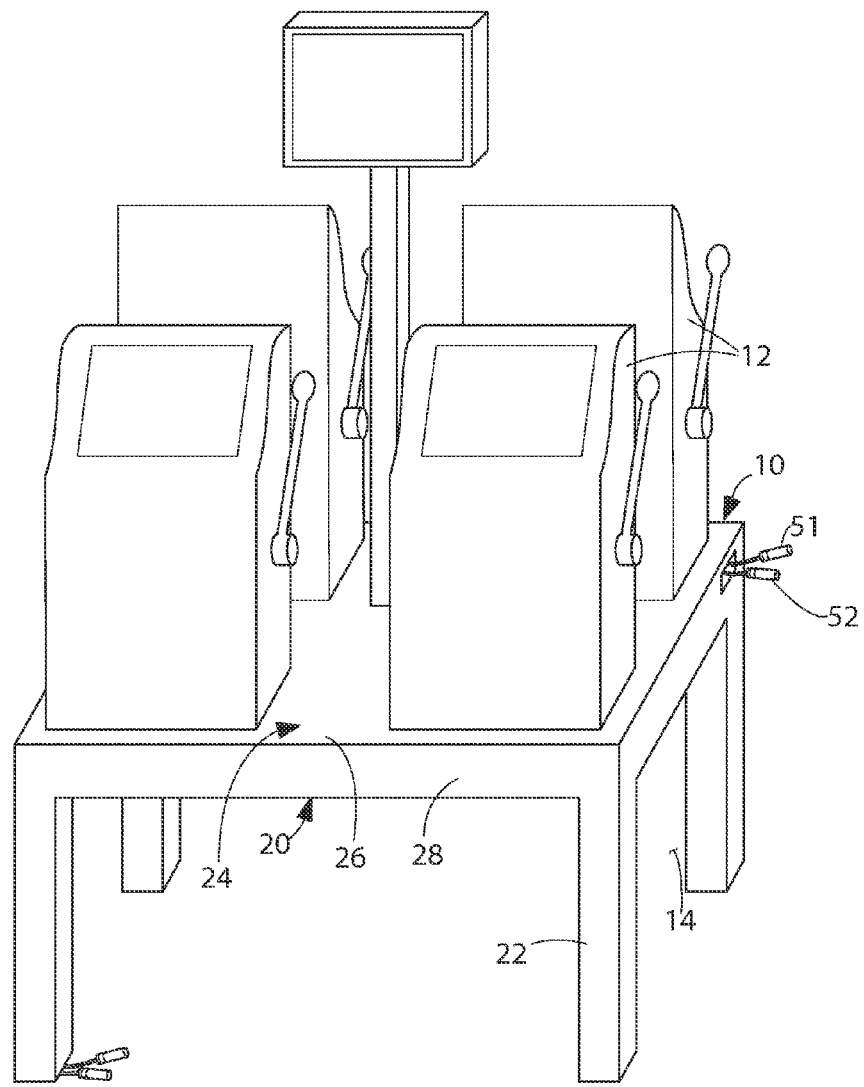
FIG. 1 is a perspective view of an exemplary embodiment of a gaming machine support system shown with a plurality of gaming machines.

Referring to FIG. 1, an exemplary embodiment of the present invention support system 10 is shown. The support system 10 is shown holding four gaming machines 12. However, it will be understood that any plurality of gaming machines 12 may be present. The purpose of the support system 10 is to support the gaming machines 12 at an ergonomically convenient height, while providing an open space 14 under the gaming machines 12. The cables and wires required by the gaming machines 12 to operate run through the structure of the support system 10, as will be explained.

A table structure 20 is provided. The table structure 20 has at least four legs 22 that support a platform 24. The platform 24 has a planar top surface 26 and short side surfaces 28 that extend downwardly from the periphery of the planar top surface 26. Although the space under the table structure is open, the space between legs 22 need not be. If desired, panels can be placed between the legs 22 to prevent unauthorized access to the underside of the table structure 20.

Figure 2:
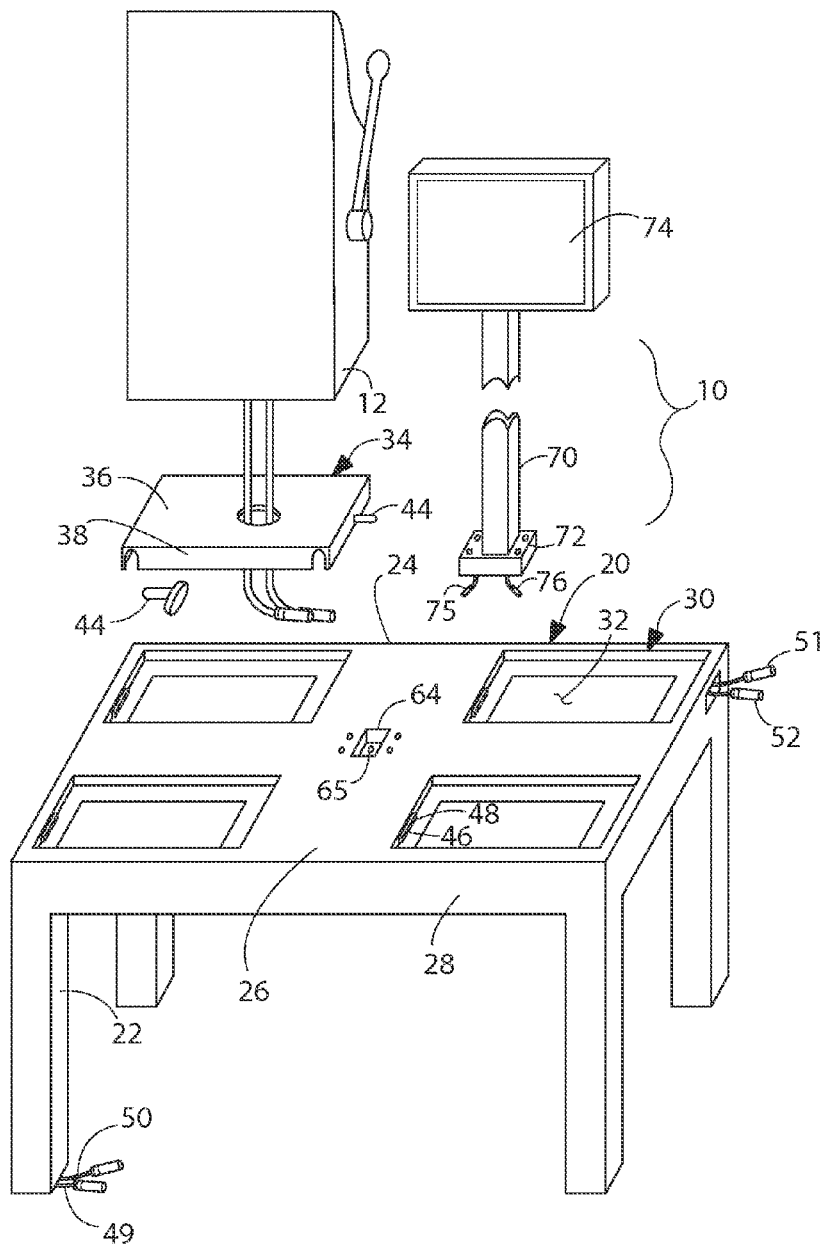
FIG. 2 is an exploded view of the embodiment of FIG. 1.

Referring to FIG. 2 in conjunction with FIG. 1, it can be seen that a plurality of gaming ports 30 are formed into the top surface 26 of the platform 24. The gaming ports 30 are openings in the top surface 26 of the platform 24 that lead into inset connection chambers 32. Each of the gaming ports 30 is preferably uniform in size.

A mounting base 34 is provided for each of the gaming ports 30. Each mounting base 34 is uniform in size and is configured to fit within a connection chamber 32 through an open gaming port 30. Each mounting base 34 has a top surface 36 and at least two sidewalls 38. When inserted into a connection chamber 32, the top surface 36 of the mounting base 34 lay flush in the same plane as the top surface 26 of the platform 24. Each of the gaming machines 12 is connected to the top surface 36 of a mounting base 34 using mechanical fasteners and/or adhesives.

Figure 3:
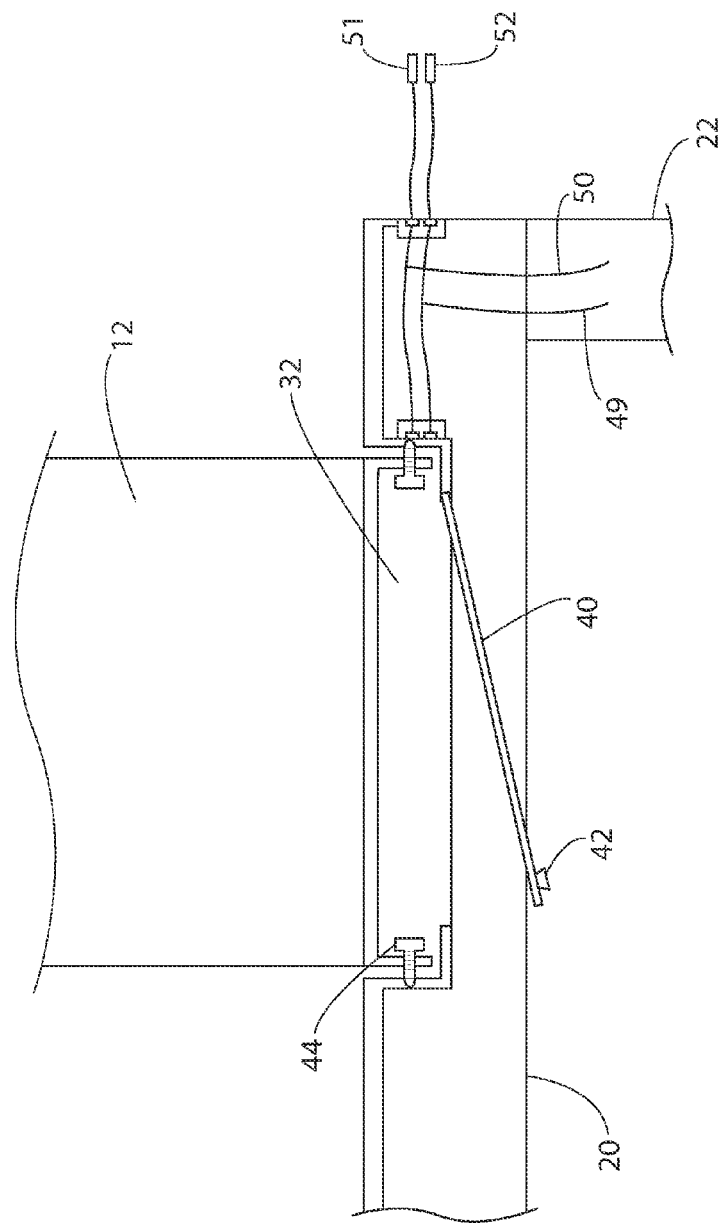
FIG. 3 is a fragmented cross-sectional view of an area of interconnection between a gaming machine and the support system.

Referring to FIG. 3 in conjunction with FIG. 2, it can be seen that each connection chamber 32 has an access panel 40 that can be selectively opened from under the table structure 20. The access panel 40 may be closed with key-head bolts, but is preferably closed using key-turned locks 42. In this way, only authorized personnel with the proper keys or tools can open the access panel 40 and access the connection chamber 32 from under the table structure 20.

Each mounting base 34 is sized to pass into a gaming port 30 and into a connection chamber 32. Lock fasteners 44, in the form of bolts or pins, are provided that extend through the sidewalls 38 and lock a mounting base 34 into a gaming port 30. The lock fasteners 44 can be engaged or disengaged by manually accessing the lock fasteners 44 through the access panel 40.

To connect a slot machine 12 to the table structure 20, a mounting base 34 is connected to the bottom of the slot machine 12. Once the mounting base 34 is connected, the mounting base 34 can be inserted into any of the connection chambers 32 through a gaming port 30. The gaming machine 12 is locked in place by passing a lock fastener 44 through the sidewall 38 of the mounting base 34. The lock fastener 44 can be set or unset manually through the locked access panel 40. Accordingly, a gaming machine 12 can be quickly attached to, or removed from, any of the gaming ports 30 present on the table structure 20.

Inside the connection chamber 32 of each gaming port 30 are two electrical connectors 46, 48. One connector 46 provides power to the gaming machine 12. The second connector 48 provides electronic signals to the gaming machine 12. The first connector 46 and the second connector 48 lead to internal power cables 49 and signal cables 50, respectively. The power cables 49 and the signal cables 50 are built into the table structure 20 and cannot be accessed by the public.

The internal power cables 49 and signal cables 50 interconnect with external cables in one of two ways. In the first way, the internal power cables 49 and the signal cables 50 extend through a leg 22 equivalent support of the table structure 20. In this manner, the cables 49, 50 can run directly into the floor of the casino.

In the second way, there are cable connections 51, 52 formed into the side surfaces 28 of the table structure 20. Cable connections 52 enable the internal power cables 49 and the signal cables 50 of different table structures 20 to interconnect when the table structures 20 are placed in adjacent positions. It will therefore be understood that multiple table structures 20 can be electronically interconnected by bringing the various table structures 20 into proper orientations.

Referring now solely to FIG. 2, it will be understood that in many casinos, gaming machine groupings have an illuminated display intended to catch the attention of passing casino patrons. The illuminated display often comes in the form of a large sign that is supported over a gaming machine table. The present invention support system 10 also enables signs to be connected to the table structure 20.

At least one sign mounting port 64 is provided on each table structure 20. The sign mounting port 64 contains electrical connectors 65 for both power and control signals. Sign poles 70 are provided. Each sign pole 70 has a base mount 72 that is sized and shaped to engage a sign mounting port 64. A modular sign 74 is provided that connects to the sign pole 70. The sign 74 can be changed or removed without effect to the table structure 20 or the gaming machines 12 that are present on the table structure 20.

The internal power cables 75 and signal cables 76 that connect to the sign 74 travel with the various cables for the gaming machines 12 and connect to external controls in the same manner as was previously described.

It will be understood that the embodiment of the present invention that is illustrated and described is merely exemplary and that a person skilled in the art can make many variations to that embodiment. For instance, the size of the table structure, the shape of the legs, the number of gaming ports and the size of the gaming ports are a matter of design choice. Furthermore, many types of mechanical connectors can be used to interconnect a mounting block within a gaming port. All such variations, modifications and alternate embodiments are intended to be included within the scope of the present invention as defined by the claims.

What is claimed is:

1. A method for mounting a gaming machine to a support, comprising the steps of:
    providing a mounting base;
    providing a support having a top surface and an open port formed through said top surface of said support;
    providing a chamber affixed to said support under said open port, wherein said chamber is sized to receive said mounting base therein;
    connecting said mounting base to said gaming machine;
    placing said gaming machine on said support so that said mounting base passes into said chamber through said open port; and
    locking said mounting base within said chamber.

2. The method according to claim 1, wherein said support is formed as a table having legs and open space between each of said legs.

3. The method according to claim 2, further including the step of connecting said gaming machine to a power cable within said chamber.

4. The method according to claim 3, further including the step of connecting said gaming machine to a signal cable within said chamber.

5. The method according to claim 4, wherein said power cable and said signal cable extend through at least one of said legs.

6. The method according to claim 1, wherein said step of providing a mounting base includes providing a form having a flat top with peripheral edges and sidewalls that extend from said peripheral edges.

7. The method according to claim 6, wherein said step of connecting said mounting base to said gaming machine includes affixing said flat top of said mounting base to a bottom surface of said gaming machine.

8. The method according to claim 1, wherein said step of providing a chamber includes providing a chamber with sidewalls.

9. The method according to claim 1, wherein said step of locking said mounting base within said chamber includes joining a sidewall of said chamber with a sidewall of said mounting base with a mechanical fastener.

10. The method according to claim 9, further including the step of providing an access port in said chamber for manually accessing said mechanical fastener.

11. The method according to claim 4, further including the step of terminating said power cable and said signal cable with connector terminations within said chamber.

12. The method according to claim 4, wherein said table has a side edge and connectors that lead through said side edge that lead to said power cable and said signal cable.

13. The method according to claim 4, further including the step of attaching a sign to said support.

14. The method according to claim 13, wherein said step of attaching a sign includes the steps of providing a sign mount on said support and connecting said sign to said sign mount.

15. The method according to claim 13, further including the step of connecting said sign to said power cable and said signal cable.

16. A method for mounting gaming machines to a support, comprising the steps of:
   providing a plurality of mounting bases, each of a standard size;
   providing a support having a top surface and a plurality of gaming ports formed in said top surface of said support, wherein each of said gaming ports has a standard size and is configured to receive any one of said plurality of mounting bases;
   connecting each of said plurality of mounting bases to a different gaming machine;
   placing said gaming machines on said support so that said mounting bases pass into said gaming ports; and
   locking said mounting bases within said gaming ports.

17. The method according to claim 16, wherein said support is formed as a table having legs and open space under said table between said legs.

18. The method according to claim 17, further including the step of connecting said gaming machines to a power cable under said top surface of said support.

19. The method according to claim 17, further including the step of connecting said gaming machines to a signal cable under said top surface of said support.

20. The method according to claim 19, wherein said power cable and said signal cable extend through at least one of said legs.

* * * * *